June 20, 1944.   C. A. PHILLIPS   2,351,834
PHOTOFLASH PHOTOGRAPHY CAMERA
Filed May 2, 1940   3 Sheets-Sheet 1
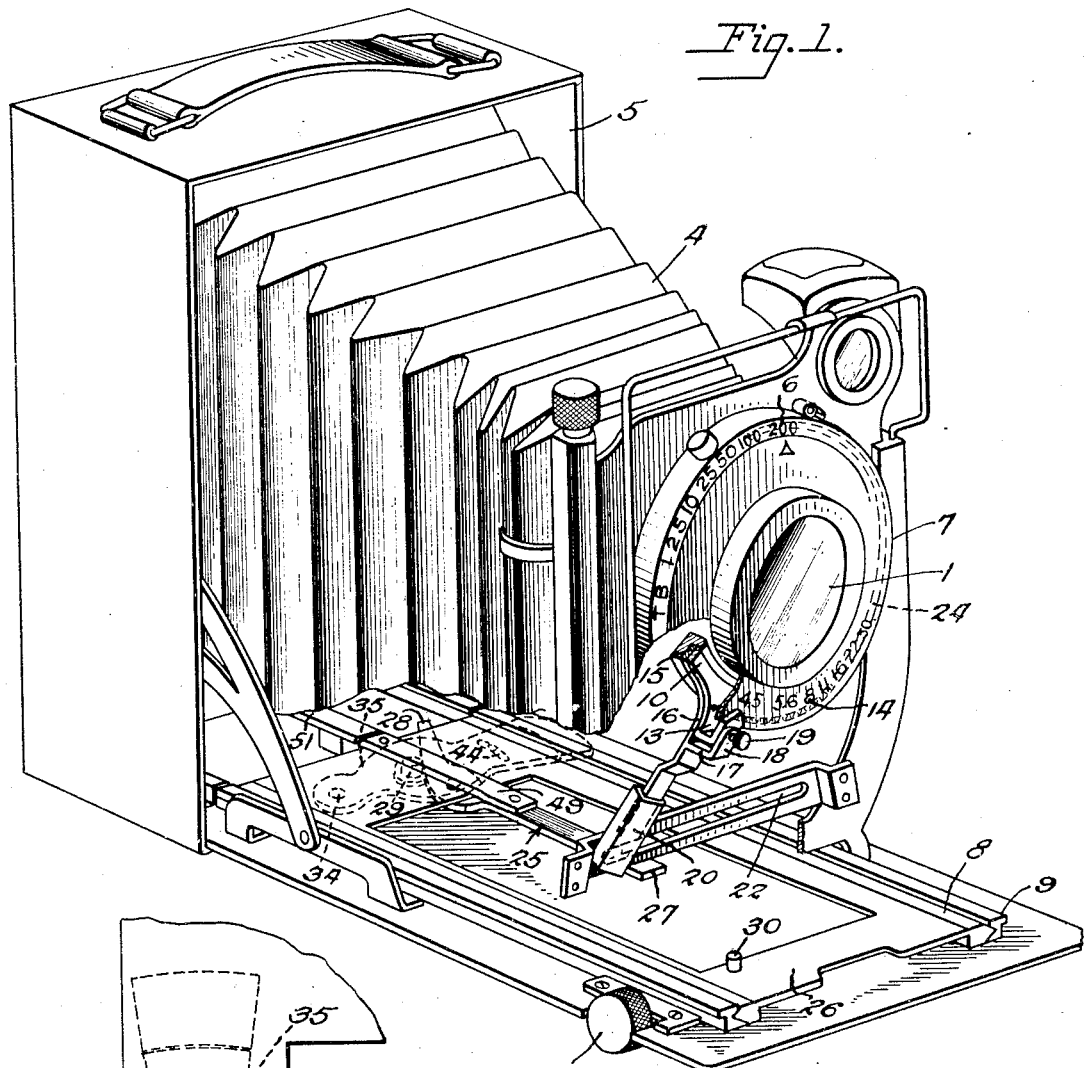
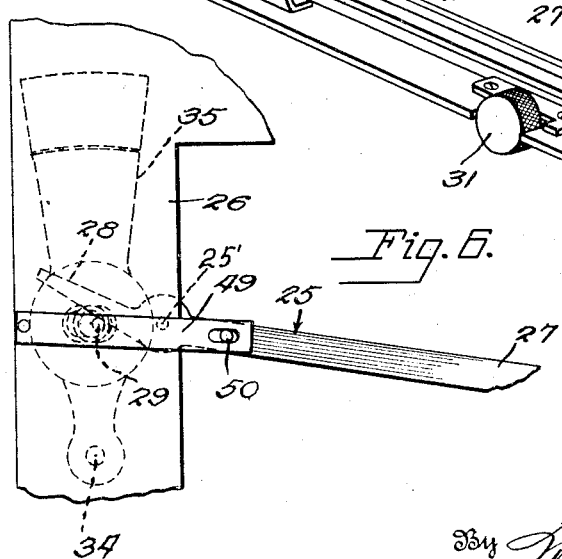
Inventor
Chandler A. Phillips
By Mason Fenwick & Lawrence
Attorneys June 20, 1944.    C. A. PHILLIPS    2,351,834
PHOTOFLASH PHOTOGRAPHY CAMERA
Filed May 2, 1940    3 Sheets-Sheet 2
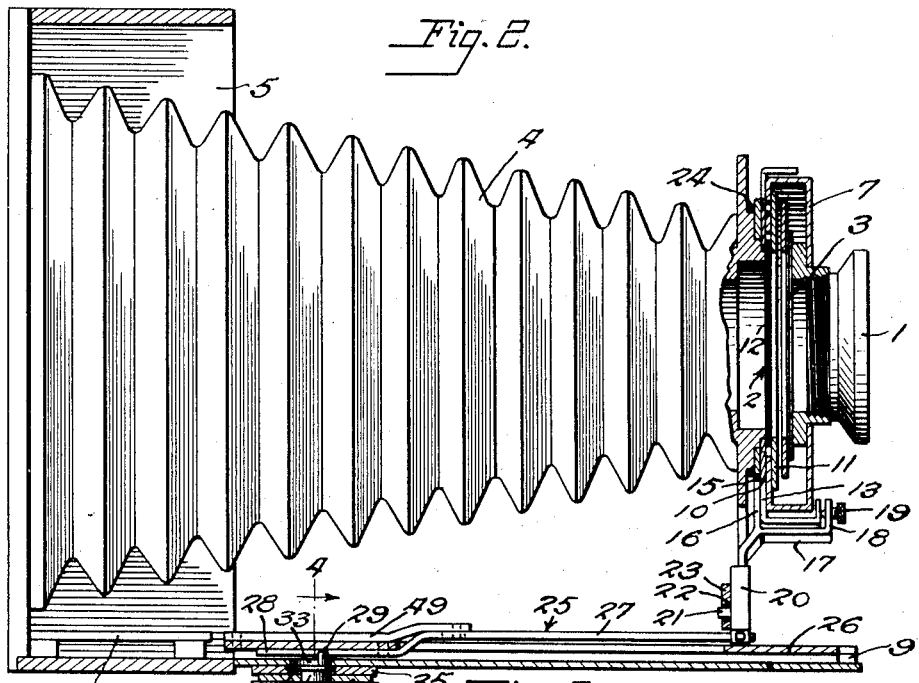
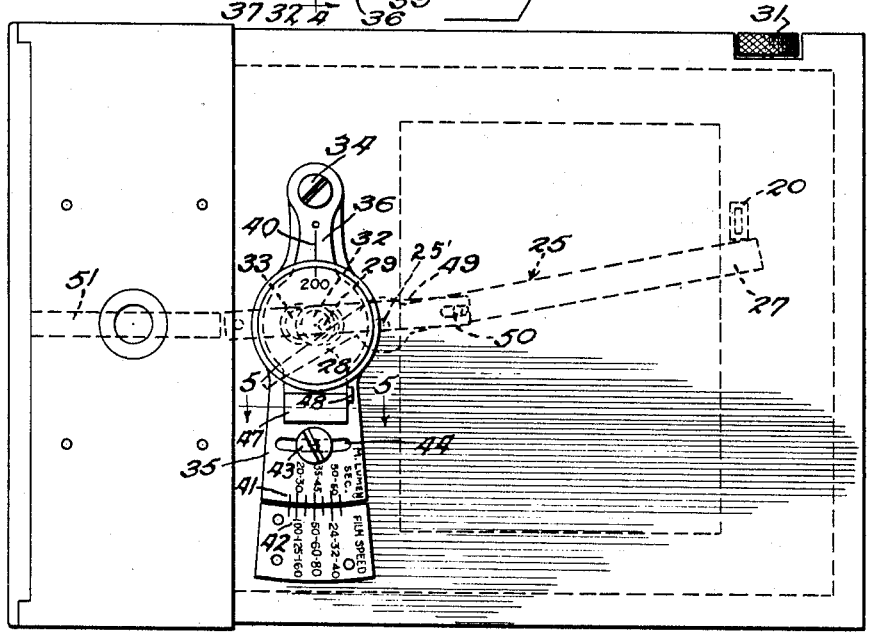
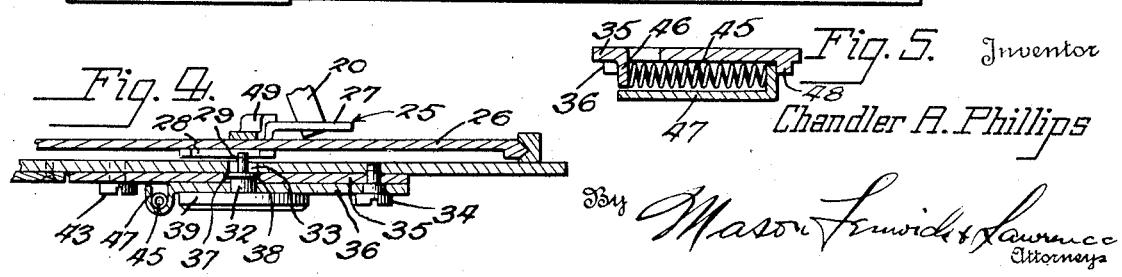
Inventor
Chandler A. Phillips
By Mason Fenwick & Lawrence
Attorneys June 20, 1944.  C. A. PHILLIPS  2,351,834
PHOTOFLASH PHOTOGRAPHY CAMERA
Filed May 2, 1940  3 Sheets-Sheet 3

Chandler A. Phillips
INVENTOR
BY Mason Fenwick + Lawrence
ATTORNEYS

Patented June 20, 1944

2,351,834

UNITED STATES PATENT OFFICE 2,351,834

PHOTOFLASH PHOTOGRAPHY CAMERA

Chandler A. Phillips, Blackwell, Okla.

Application May 2, 1940, Serial No. 333,038

14 Claims. (Cl. 95—64)

This invention relates to improvements in photographic apparatus for use with artificial lighting, and has for its object the provision in such apparatus, of means to automatically adjust the size of the diaphragm aperture in accordance with the distance for which the objective lens is focused, with corrective compensation for known factors of light intensity, shutter speed and film sensitivity.

Another object of the invention is the provision of a camera in which the diaphragm aperture is adapted to be automatically adjusted in direct ratio to the distance of an object from the camera, with the ratio variable to compensate for known factors and varying conditions, whereby equivalent amounts of light will be admitted to the camera from an object at different distances from the source of artificial illumination located near the camera.

Still another object is to provide such a camera in which provision for compensation for the various factors may be introduced into the diaphragm aperture regulating means prior to the focusing of the camera, but in which the resultant ratio may be varied after the camera has been focused, to meet changed conditions.

A still further object is the provision of readily accessible and conveniently grouped control means whereby the ratio can be readily set and easily corrected for errors due to changed conditions.

Another object is the provision of means to permit each factor to be introduced separately, by means of a separate control, but all of the controls affecting the same mechanism, to the end that the ultimate ratio setting includes the aggregate compensation for all known factors affecting the exposure.

It is an object of this invention to provide means to indicate when the diaphragm has reached its limits of movement, although focusing may continue after such limits have been reached.

Another object is to provide means for maintaining control of the diaphragm aperture regulating means at all times, and in all positions, so that such regulating means will always be in proper position when the lens is drawn out to the infinity stop.

Another object is the provision of means correlating the adjustment of the diaphragm aperture to the focusing of the lens in such manner that the ratio between focus and diaphragm aperture will be correct, even though lenses of different focal lengths are used interchangeably.

Other objects will become apparent in the following description and claims forming a part of this application.

In the drawings, throughout the several figures of which like numerals refer to like parts:

Figure 1 is a perspective view of a camera embodying the principles of the present invention, parts being broken away to show details of the mechanism;

Figure 2 is a longitudinal section with the camera in open position and the lens moved outward to the infinity stop;

Figure 3 is a bottom plan view of the camera;

Figure 4 is a sectional view through the control mechanism taken on the line 4—4 of Figure 2;

Figure 5 is a detail section taken on the line 5—5 of Figure 3;

Figure 6 is a fragmentary detail of a portion of the lens-adjusting plate and associated parts.

Figure 7:
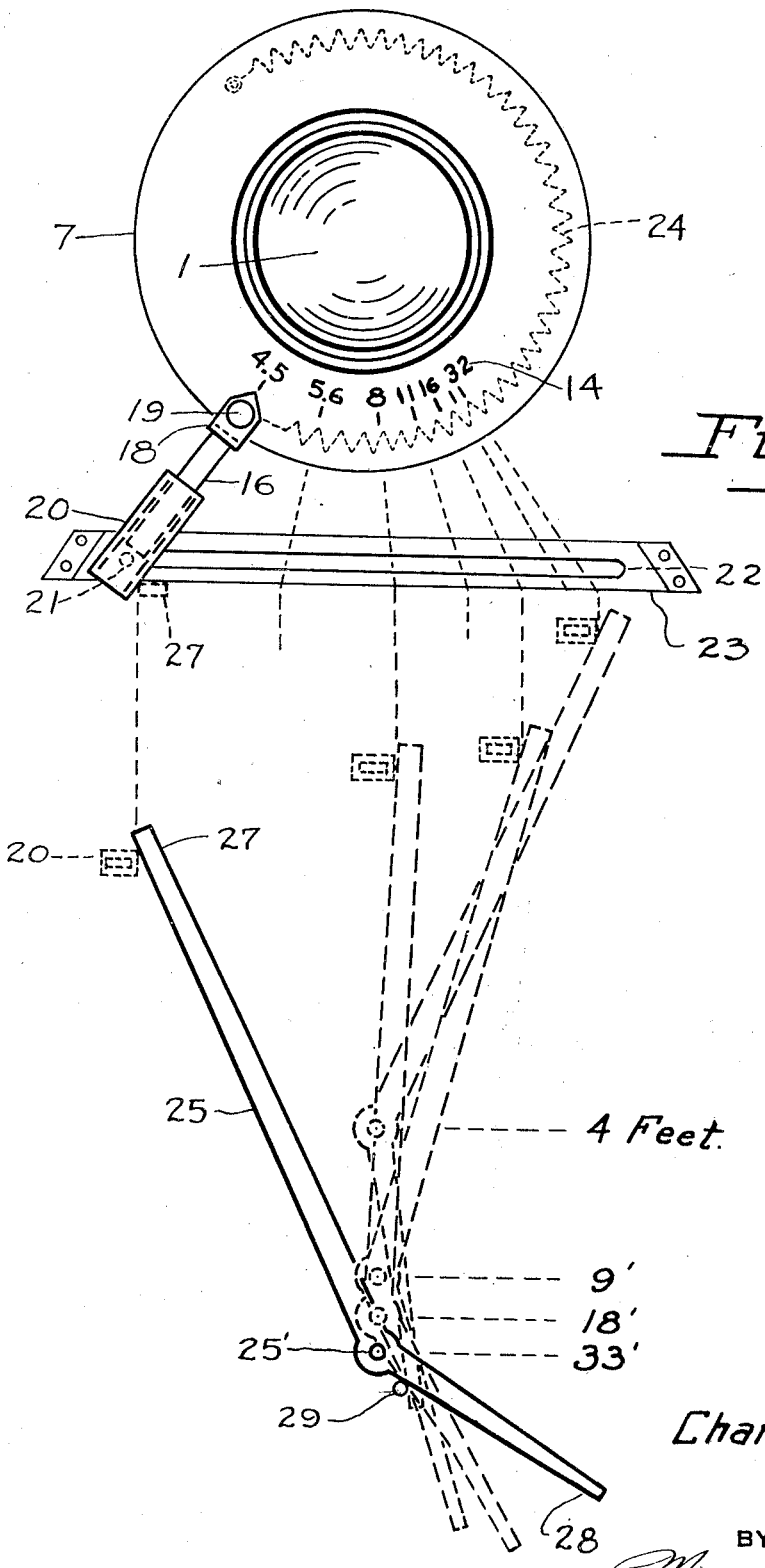
Figure 7 is a diagrammatic view illustrating the operation of the interconnection between the lens adjusting means and the diaphragm adjusting means.

Referring to the drawings in detail, a conventional camera is shown having a lens 1, iris type diaphragm 2, shutter 3, bellows 4 and case 5. As is usual in such cameras, the shutter is mounted intermediate the lens and diaphragm, and has control mechanism, indicated conventionally at 6, providing a plurality of settings for various speeds of the shutter. The three elements, lens, shutter and diaphragm, are supported in axial alignment within the lens holder 7, which is mounted to slide upon rails 8 carried by the bed track 9.

In making photoflash exposures, the illumination of the object to be photographed depends upon the power of the photoflash bulb used and the distance of the object from the source of light. Since the source of artificial light is located near the camera, usually attached thereto, the amount of light reflected by the object will vary in accordance with the distance the camera and light source are spaced from the object. When the lens is focused upon an object, the position of the lens with respect to the stationary parts of the camera, bears a direct relationship to the distance of the object from the camera. This invention employs this fact in conjunction with the well known inverse square law of light as a basis in providing means to automatically adjust the diaphragm aperture, provision being made to compensate for the power of the photoflash bulb, the sensitivity of the film used and the speed for which the shutter is set.

The well known iris type diaphragm, shown conventionally in section in Figure 2, consists of two rings 10 and 11, and a plurality of adjustable leaves 12. Ring 10 is rotatable to change the position of the leaves 12 to vary the size of the aperture. An arm 13 extends from the periphery of ring 10, and is bent forwardly and then upwardly in front of the lens holder, where it moves over a scale 14 indicating the setting of the diaphragm aperture. Under prior practice the arm 13 was manually moved across the scale 14 to set the diaphragm to any desired stop.

The present invention provides an actuating ring 15, mounted for rotation upon the lens holder, directly in back of the ring 10. An arm 16 projects outwardly from the ring 15 and carries a bracket 17 extending at right angles to the arm and having its end portion turned upwardly as at 18. A screw 19 passes through the vertical portion 18 of the bracket 17 to engage the arm 13 of the ring 10, whereby movement of the ring 15 imparts adjusting movement to the diaphragm.

The lower end of arm 16 is freely slidable in a sleeve 20 which travels transversely of the camera, guided by a pin 21 carried by the sleeve. Pin 21 rides in a slot 22 formed in a bridge piece 23 mounted between the supporting legs of the lens holder. This permits the arm 16 to swing on an arc, while the sleeve 20, which is really an extension of the arm 16, moves in a straight line.

Coil spring 24 is secured at one end to the arm 16, and has its opposite end fixed to the lens holder to bias the ring 15 in a counterclockwise direction, when viewed from the front, to adjust the diaphragm to its smallest opening.

To effect movement of the diaphragm aperture adjusting means, and to determine the setting of the diaphragm aperture, a lever 25 is pivotally mounted as at 25′ on the movable bed plate 26 with one of its arms, the arm 27 engaging the lower end of the sleeve 20. The opposite arm 28 of the lever 25 extends at an angle with respect to arm 27, in a manner to be described, and is held in sliding engagement with a stop or eccentric pin 29 mounted upon the stationary base which supports the camera.

When the camera has been opened and the lens drawn out to its infinity stop, that is with the lens holder supporting frame contacting the stop pin 30, the diaphragm aperture should be at its widest, to admit the greatest amount of light. This will necessitate the diaphragm aperture adjusting means being at the limit of its movement in a contra-biased direction and the lever 25 and the eccentric pin 29 are designed and positioned to accomplish this. The drawings show the parts in this position. It will be obvious that spring 24 will cause arm 16 to exert pressure against the arm 27 of lever 25 maintaining the arm 28 in contact with eccentric pin 29.

To focus the camera, knob 31 is rotated which, through the conventional rack and pinion, not shown, moves the bed plate 26, thus moving the lens. It will be remembered that the lever 25 is pivoted at 25′ to the bed plate 26; and therefore, moves with it, while the eccentric pin 29 is mounted in the stationary base. It will be readily seen that as the bed plate moves, the distance between the eccentric pin and the pivot of the lever 25 will vary, and the arm 28 will slide against the eccentric pin 29. As the face of the arm 28 slides against the eccentric pin 29, lever 25 will swing under the urge of diaphragm biasing spring 24 to permit movement of the diaphragm aperture regulating means. The angle and shape of arm 28 is such that in all positions of the lens the diaphragm aperture will be adjusted in direct ratio to the square of the range for which the lens is focused.

It will be understood that the intensity of illumination of an object from a light source positioned at the camera varies inversely as the square of the distance from the camera to the object. To maintain the quantity of light reflected by the object and passing through the lens substantially constant it is necessary that the diaphragm be opened in substantially direct ratio as the square of the distance from the camera to the object. The scale of adjustment of the diaphragm operating mechanism is of a substantially logarithmic nature, that is, the scale divisions indicating 50% reductions in the opening area are spaced progressively closer together proceeding from the position of the largest opening to that of the smallest opening. The focusing characteristic of the lens is also non-linear in nature, that is, as the lens is focused for progressively shorter distances, the lens must be moved forward from the focal plane in progressively increasing increments. It will be apparent, therefore, that the interconnection between the lens adjustment and the diaphragm adjustment must be capable of translating the accelerating movement of the lens bedplate, as it is moved from the infinity stop, into a second decelerating movement for effecting proper reductions in the size of the diaphragm opening. This mode of operation is illustrated in the diagrammatic sketch of Figure 7 which, for purposes of greater clarity, illustrates the lever 25 in the same plane as the lens 1. The lever 25 is therein indicated in various relative positions of adjustment for effecting corresponding adjustments of the diaphragm for a given set of conditions as to film speed, shutter speed, and light intensity. The lever 25 is illustrated in full line for the position corresponding to a lens adjustment for 33 feet and in dotted lines for positions corresponding to lens adjustments for 18 feet, 9 feet, and 4 feet, respectively, it being understood that since the arm 25 is pivoted as at 25′ to the bedplate, the arm will move forward with the lens. The diaphragm adjusting arm 16 is indicated in corresponding positions of adjustment, namely, f4.5, f8, f16, and f32, respectively, so as to admit equal amounts of light at the corresponding distances. It will be observed that the arm 28 sliding forwardly against the pin 29 permits a relatively greater angular movement of the arm 27 for relatively small increments of movement when the arm pivot point 25′ is close to the pin 29 than when the pivot point 25′ is remote from the pin 29. Thus movement of the bedplate through the relatively small longitudinal distance from the 33 foot position to the 18 foot position effects adjustment of the diaphragm aperture through the wide range of movement from f4.5 to f8 due to the wide angular sweep of the arm 27. In focusing the lens on objects at short range the lever is moved forwardly in increasingly greater increments per foot of focusing distance while, on the other hand, the rate of angular movement of arm 27 decreases steadily so that the diaphragm aperture is decreased in size in progressively smaller increments.

The exact configuration of the surface of arm 28 for sliding against pin 29, the angular relation between the arms 28 and 27, the initial spacing of the arm pivot point 25' relative to the pin 29, may readily be determined for the particular characteristics of the lens and diaphragm adjustment means of the camera at hand. In general it may be stated, therefore, that the invention provides means in the form of an interconnection between the lens adjustment means and the diaphragm adjustment means whereby the latter is adjusted automatically in accordance with adjustment of the former substantially in direct ratio to the square of the range of the lens focus. The interconnection comprises means whereby the accelerating ratio of movement of the lens in focusing from infinity per unit of distance is translated into a decelerating ratio of movement per unit of angular movement of the diaphragm adjusting means in moving from the wide to the small open condition. In the claims, the interconnecting means having such a motion transmitting characteristic is, for convenience, briefly defined as an inverse ratio motion transmitting means.

Although the foregoing provides for ideal adjustments of the diaphragm aperture in relation to the distance for which the lens is focused, there are certain factors affecting an exposure which must be compensated for to produce perfect negatives. The power of the photoflash bulb must be compensated for, a powerful bulb requiring stopping down of the diaphragm aperture, and a weak bulb necessitating a wider diaphragm opening. The sensitivity of the film used must be taken into consideration, as well as the speed for which the shutter is set. A supersensitive film requires less light than a slow film, and a fast shutter will require more light than a slow shutter.

To compensate for these known factors, means are provided to change the position of the eccentric pin 29 so as to correctively control the movement of the diaphragm aperture regulating means.

Pin 29 is mounted eccentrically upon the end of a short shaft 32 and passes through an elongated opening 33 in the camera base. Pivoted at 34 to the under side of the camera base in superimposed position are two plates 35 and 36. Shaft 32 is journalled in plate 36 and passes through an elongated opening in plate 35, similar to opening 33 in the base, and is prevented from moving axially by flange 37 abutting shoulder 38, formed about the opening in plate 35, and dial 39 secured to the opposite end of the shaft. Dial 39 is graduated and marked to correspond to the various speeds of the shutter, and a line 40 upon the face of plate 36 forms a datum for the setting of the dial. When dial 39 is rotated to bring the graduation corresponding to the speed for which the shutter is set into alignment with the datum line, eccentric pin 29 is moved circumferentially of the shaft 32. This changes the position of lever 25, and so changes the setting of the diaphragm aperture to admit more or less light as the case may be.

The end of plate 35 opposite the pivot 34 is arcuate, and provided with a scale 41, graduated in accordance with the light output ratings of the various powers of photoflash bulbs. This scale is designed to be used in conjunction with a scale 42, having markings indicative of different film speeds. Plate 35 is held in fixed position by means of a screw 43 passing through slot 44 in the plate.

The companion plates 35 and 36 bear a fixed relationship to one another under normal conditions, which relationship is maintained by a coil spring 45 exerting pressure between an abutment 46 on plate 35 and the end of spring housing 47 carried by plate 36, to force the housing against a stop 48 on the plate 35. As shaft 32 of eccentric pin 29 is journalled in plate 36, movement of the plate 35 and consequent movement of plate 36 results in movement of pin 29.

In actual use, the operator must first determine the power of the photoflash bulb which he intends to use, the sensitivity of the film with which he is going to load the camera, and the shutter speed best suited for the particular exposure. Then by loosening screw 43, plate 35 may be moved to place the graduation on scale 41 corresponding to his photoflash bulb rating opposite the graduation on scale 42 marked for the sensitivity of the film with which the camera is loaded. This will cause pin 29 to be shifted in elongated opening 33, longitudinally of the camera, changing its position relative to the pivot of lever 25 and thus changing the initial setting of the diaphragm to compensate for light and film speed. Dial 39 is then set, as has been described previously, to inject shutter speed compensation into the diaphragm adjusting mechanism. These various manipulations have imparted two movements to the pin 29; a bodily longitudinal shifting of the pin and the shaft 32 which carries the pin, either toward or away from the pivot of lever 25, and an arcuate movement of the pin about the axis of shaft 32. Both movements affect the setting of the diaphragm aperture, and the resultant position of the pin 29 is representative of the aggregate compensation for all known factors affecting the exposure.

The camera is now ready to be focused. Rotation of knob 31 moves the bed plate 26 to focus the lens. As the bed plate is moved, the curved arm 28 of lever 25 will slide against the pin 29 permitting the lever to swing, to effect adjustment of the diaphragm aperture. The position of pin 29 will determine the setting of the diaphragm aperture for any focus under a particular set of given conditions.

If after the camera is focused it is decided that the diaphragm aperture should be larger or smaller, because of the color of the object to be photographed or other reasons, or that a different shutter speed should be used, these corrections can be made by adjusting the various controls to change the setting of the pin 29. Movement of the pin will cause proportionate change in the size of the diaphragm aperture.

It can readily be seen that if the arms of lever 25 are made sufficiently long, lenses of various focal lengths may be used interchangeably. The only change necessary would be that of moving the infinity stop pin 30.

Provision has been made to prevent damage to the camera, as well as to warn the operator, should the diaphragm reach either of its limits of movement during the focusing of the lens. If, as the lens is moved outwardly, the diaphragm should reach its smallest stop, lever 25 will no longer be pressed against the pin 29 under the influence of the diaphragm biasing spring, and consequently the focusing knob will turn much easier, indicating to the operator that the limit has been reached. If, on the other hand, the diaphragm should reach its widest stop during a reverse movement of the lens, or while setting the plate 35, lever 25 will be pressed against pin 29 with an increased pressure. Due to the yielding spring connection between plates 35 and 36 no damage can result as spring 45 will compress allowing the pin 29 and shaft 32 to move under the pressure of the lever. Spring 45 is considerably stronger than the diaphragm biasing spring 24, and therefore, the plates 35 and 36 will remain in fixed relationship until such time as the limit stop of the diaphragm is reached.

In order to be able to close the camera and still maintain control of the diaphragm adjusting means to insure proper positioning of the parts when the lens is brought out to its infinity stop, a link 49 is pivotally connected to the camera base near the hinge. The opposite end of the link has a pin and slot connection 50 with the arm 27 of lever 25.

As the lens is moved back in order to close the camera, diaphragm-biasing spring 24 will maintain sleeve 20 in contact with arm 27 until the sleeve reaches the link 49, whereupon the sleeve will follow the link to its end, and then be guided into the case by a fixed guide 51.

Thus it can be seen that the diaphragm-adjusting means is under control at all times and in all positions of the lens so that the size of the diaphragm aperture will always be correct whenever the lens is focused.

By loosening screw 19, the lever 16 may be disconnected from the diaphragm operating arm 13, which latter arm is then free for independent manual adjustment. Thus the interconnection between the diaphragm adjusting means and the lens adjusting means may readily be removed and the camera may then be operated in a conventional manner as when taking pictures under daylight conditions.

What I claim is:

1. In a camera particularly adapted for making photoflash exposures and having means for focusing the lens, means for regulating the size of the diaphragm aperture, means for biasing the diaphragm aperture regulating means in one direction, means interconnecting said lens focusing means and said diaphragm regulating means comprising a pivoted lever longitudinally movable with said lens focusing means, said lever being biased for angular movement about the pivot thereof by said diaphragm biasing means, and means secured relative to the focal plane for determining the rate of angular movement of said lever about its pivot as it is moved longitudinally whereby adjustment of the diaphragm aperture is made in accordance with substantially the square of the distance from the camera to the object of lens focus.

2. In a camera particularly adapted for making photoflash exposures and having longitudinally movable means for focusing the lens, means for adjusting the size of the diaphragm aperture, means biasing the diaphragm adjusting means in one direction, a pivoted lever mounted for longitudinal movement with the lens focusing means, one end of said lever being operatively connected to said diaphragm adjusting means and and biased for angular movement about the pivot in one direction thereby, stationary means for engaging the opposite end of said lever for determining the angular movement of said lever about the pivot thereof in accordance with the longitudinal movement of said lever whereby said diaphragm aperture is adjusted in a direct ratio substantially in accordance with the square of the distance for which the lens is focused.

3. In a camera particularly adapted for making photoflash exposures and having means for focusing the lens, means for regulating the size of the diaphragm aperture, a lever pivoted intermediate its ends to a portion longitudinally movable with the lens focusing means, one end of said lever being operatively connected to said diaphragm regulating means, means adjustably mounted relative to the focal plane of said lens and adapted to be engaged by the opposite end of said lever for determining the angular movement of said lever about the pivot thereof as said lever is moved longitudinally with said lens focusing means whereby adjustment is made of the diaphragm aperture in a direct ratio substantially in accordance with the square of the distance to the object of focus, and guiding means secured to said lever for insuring engagement of the diaphragm aperture regulating means with the corresponding end of said lever as said lens is moved outwardly.

4. In a camera particularly adapted for making photoflash exposures and having means for focusing the lens, means for adjusting the size of the diaphragm aperture, means interconnecting said lens focusing and said diaphragm aperture adjusting means comprising a lever pivoted intermediate its ends upon a part lineally movable with said lens focusing means, one end of said lever being operatively connected to said diaphragm aperture adjusting means, a stop adjustably mounted relative to the focal plane of said lens and adapted to be engaged by the opposite end of said lever to determine an angular movement thereof about its pivot upon movement with said lens focusing means, and means for adjusting said stop to further control the angular movement of said pivoted lever whereby corrective compensation for known factors of light intensity, shutter speed and film sensitivity may be made for the diaphragm aperture.

5. In a camera particularly adapted for making photoflash exposures and having means for focusing the lens, means for adjusting the size of the diaphragm aperture, means interconnecting said lens focusing and said diaphragm adjusting means, said interconnecting means comprising a lever pivoted intermediate its ends upon a support longitudinally movable with said lens focusing means, means biasing said lever and diaphragm adjusting means in one angular direction, and means adjustably secured relative to the focal plane of said lens for engaging said lever to determine the rate of angular movement thereof in accordance with movement of said lever with said lens focusing means, said last mentioned means being adjustable whereby corrective compensation for known factors of light intensity, shutter speed and film sensitivity may be made for the diaphragm aperture.

6. In a camera particularly adapted for making photoflash exposures and having means for focusing the lens, means for adjusting the size of the diaphragm aperture, means interconnecting said lens focusing and said diaphragm adjusting means comprising a lever pivoted intermediate its ends upon a support movable longitudinally with said lens focusing means, one end of said lever being operatively connected to said diaphragm adjusting means, means biasing said lever and said diaphragm adjusting means in one angular direction, means for engaging the opposite end of said lever for determining the angular movement of said lever about said pivot by said biasing means in accordance with the adjustment of said lens, said last mentioned means comprising an eccentrically mounted pin adjustable for making corrective compensation of the diaphragm aperture.

7. In a camera particularly adapted for making photoflash exposures and having means for focusing the lens, means for adjusting the size of the diaphragm aperture, means interconnecting said lens focusing and diaphragm adjusting means whereby adjustment of the diaphragm aperture is automatically made in a ratio corresponding substantially to the square of the distance from the camera to the object of focus as the lens is adjusted, means for adjusting said interconnecting means whereby corrective compensation for known factors of light intensity, shutter speed and film sensitivity may be made to the diaphragm aperture, and means for indicating the diaphragm aperture regulating means reaching its limit of movement in either direction.

8. In a camera particularly adapted for making photoflash exposures and having means for focusing the lens, means for adjusting the size of the diaphragm aperture, means interconnecting said lens focusing and diaphragm aperture adjusting means whereby the diaphragm aperture is automatically adjusted substantially in accordance with the square of the distance from the camera to the objective as the lens is focused, variable means for controlling said interconnecting means whereby corrective compensation for known factors of light intensity, shutter speed and film sensitivity may be made to the diaphragm aperture, said interconnecting means being so constructed and arranged as to maintain the correct ratio of adjustment between the diaphragm aperture with respect to the adjustment of the lens irrespective of the focal length of the particular lens used on the camera.

9. A photoflash photography camera having a lens and an adjustable diaphragm, means for manually focusing said lens, means for adjusting the aperture of said diaphragm, said diaphragm aperture being normally relatively wide open for long distance focus of said lens, means interconnecting said lens focusing means and said diaphragm aperture adjusting means whereby the diaphragm aperture is decreased in size from said relatively wide open condition as said lens is focused for shorter distances, said interconnecting means including an inverse ratio motion transmitting means whereby movement of said lens adjustment means from long distance to short distance focus effects a progressive decrease in size of said diaphragm aperture with a progressively diminishing rate of movement of said diaphragm adjusting means per unit of movement of said lens focusing means.

10. A photoflash photography camera having a lens and an adjustable diaphragm, means for manually adjusting said lens relative to the focal plane thereof, means for adjusting the aperture of said diaphragm, said diaphragm being normally relatively wide open for long distance focus of said lens, operating means operatively interconnecting said lens adjusting means and said diaphragm aperture adjusting means whereby said diaphragm aperture is automatically decreased in size from said relatively wide open condition as said lens is focused for shorter distances, said operating means including an inverse ratio motion transmitting means whereby said diaphragm aperture is decreased with a progressively decreasing ratio of movement of said diaphragm adjusting means per unit of movement of said lens in focusing for progressively shorter distances, and means for disconnecting said operating means to permit independent manual adjustment of said diaphragm.

11. A photoflash photography camera having a lens and a diaphragm, manually operable means for adjusting said lens, means for adjusting said diaphragm, means interconnecting said lens and diaphragm adjusting means whereby said diaphragm is automatically adjusted upon adjustment of said lens, said interconnecting means comprising an inverse ratio motion transmitting means for translating each successive unit of lens movement in focusing from long to short distances into progressively decreasing degrees of movement of the diaphragm adjusting means in moving from large to small conditions of opening.

12. In a camera having a lens and a diaphragm, means for manually adjusting said lens, means for adjusting said diaphragm, the aperture of said diaphragm being normally relatively wide open during long distance focus of said lens, means responsive to focusing adjustment of said lens for automatically operating said diaphragm adjusting means to progressively decrease the diaphragm aperture as said lens is focused for progressively shorter distances, said last mentioned means comprising an inverse ratio motion transmitting means operatively connected between said manual adjusting means and said diaphragm adjusting means whereby the diaphragm aperture will be decreased substantially in a direct ratio to the square of the range for which said lens is adjusted.

13. In a camera particularly adapted for taking photographs of objects illuminated from a light source arranged adjacent the camera, said camera having an adjustable lens and an adjustable diaphragm, the diaphragm aperture being normally relatively wide open for long distance focus of said lens, a manually operable means operatively connected to both said lens and said diaphragm, the connection between said manually operable means and said diaphragm including an inverse ratio motion transmitting means whereby the diaphragm aperture is decreased in size automatically in accordance with focusing adjustment of said lens for progressively shorter distances in a direct ratio according to substantially the square of the distance for which said lens is adjusted.

14. A photoflash photography camera having a lens, means for focusing said lens, a diaphragm including means for adjusting the aperture thereof, said aperture being normally relatively wide open at long distance focus of said lens, means responsive to movements of said lens in focusing for shorter distances to correspondingly decrease the diaphragm aperture, said last mentioned means including an actuating member operatively connected to said diaphragm adjusting means, and an inverse ratio control means operatively connected between said lens focusing means and said member whereby said diaphragm aperture is adjusted substantially in direct proportion to the square of the distance as said lens is moved from long to short distance focus positions.

CHANDLER A. PHILLIPS.